(12) United States Patent
Moore et al.

(10) Patent No.: US 7,540,502 B1
(45) Date of Patent: Jun. 2, 2009

(54) SERPENTINE METAL GASKET

(75) Inventors: Timothy Moore, Norfolk, VA (US);
Charles Edwin Reece, Yorktown, VA (US)

(73) Assignee: Jefferson Science Associates, LLC, Newport News, VA (US)

( * ) Notice: Subject to any disclaimer, the term of this patent is extended or adjusted under 35 U.S.C. 154(b) by 0 days.

(21) Appl. No.: 11/366,237

(22) Filed: Mar. 2, 2006

(51) Int. Cl.
*F16L 17/06* (2006.01)

(52) U.S. Cl. ............... 277/608; 277/606; 277/626; 285/368; 285/904; 285/917

(58) Field of Classification Search ........... 285/368, 285/904, 917; 277/606, 608, 626, 630, 644, 277/653

See application file for complete search history.

(56) References Cited

U.S. PATENT DOCUMENTS

| 2,307,440 | A  * | 1/1943  | Wilson .............. 277/612 |
| 6,631,910 | B2 * | 10/2003 | Caplain et al. ......... 277/644 |
| 6,769,696 | B2 * | 8/2004  | Diez et al. ............ 277/593 |
| 2003/0102633 | A1 * | 6/2003 | Abiko ................ 277/529 |

* cited by examiner

*Primary Examiner*—Aaron M Dunwoody
*Assistant Examiner*—Fannie Kee

(57) ABSTRACT

A metallic seal or gasket for use in the joining of cryogenic fluid conduits, the seal or gasket having a generally planar and serpentine periphery defining a central aperture. According to a preferred embodiment, the periphery has at least two opposing elongated serpentine sides and two opposing arcuate ends joining the opposing elongated serpentine sides and is of a hexagonal cross-section.

6 Claims, 2 Drawing Sheets

SERPENTINE METAL GASKET

The United States of America may have certain rights to this invention under Management and Operating Contract DE-AC05-84ER 40150 from the United States Department of Energy.

FIELD OF THE INVENTION

The present invention relates to metallic gaskets for sealing joints between vacuum conducting elements of dissimilar materials and more particularly to such a gasket that is useful in cryogenic applications.

BACKGROUND OF THE INVENTION

In many research and commercial applications, there exists the need to provide joints between cryogenic vacuum conductive elements such as pipes and the like. Such a need is apparent in the construction and operation of, for example, particle accelerators and other superconductive experimental arrangements and apparatus. Such seals are conventionally attained through the use of a gasket or seal between flanges located on each of the vacuum conductive members. Many such fluid conductors are generally rectangular in shape for a variety of reasons that are not important to the invention described herein. Conventional overall rectangular gaskets or seals used to seal joints in such applications generally have a rectangular or hexagonal cross-section. Such seals have proven relatively unreliable due to the propensity of the straight portions of such generally rectangular seals to rotate as the dissimilar materials of the seals and the cryogenic conduits contract under cryogenic conditions. This problem is not so prevalent when the cryogenic conduits being joined are round since forces exerted upon the seal are generally more balanced than in the case where the conduits have a more rectangular overall shape.

One solution proposed for this problem has been to constrain the seals by incorporating tight tolerances and restraining features in the seal and flange design of the joint or fitting. Such a solution is relatively high cost and removal of the seals after use is often very difficult.

OBJECT OF THE INVENTION

It is therefore an object of the present invention to provide a gasket or seal between cryogenic conduits that eliminates both the rotation and cost issues just described.

SUMMARY OF THE INVENTION

According to the present invention, there is provided a metallic seal or gasket for use in the joining of cryogenic vacuum conduits, the seal or gasket comprising a generally planar and serpentine periphery defining a central aperture. According to a preferred embodiment, the periphery has at least one straight side or two opposing, elongated, serpentine straight sides and two opposing arcuate ends joining the opposing elongated serpentine sides.

DETAILED DESCRIPTION

Figure 1:
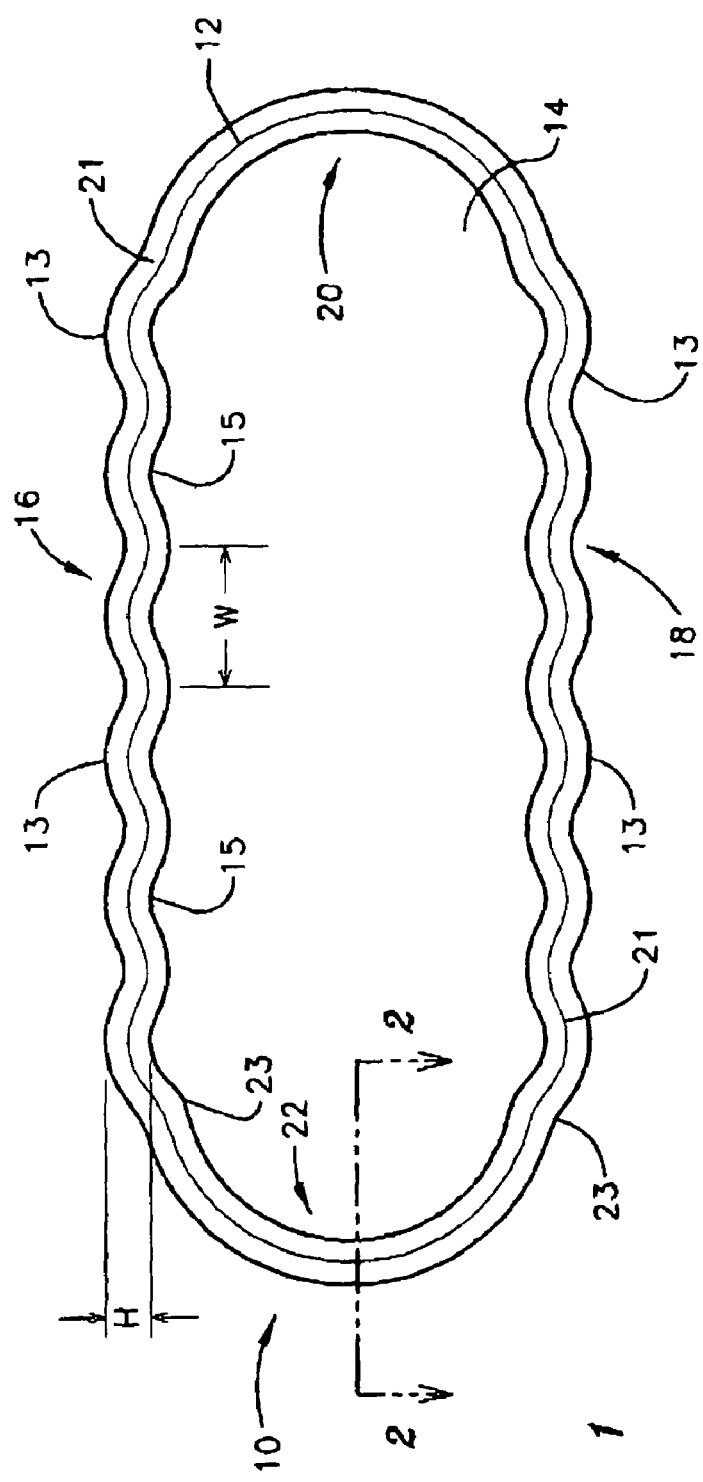
FIG. 1 is a top plan view of the gasket or seal of the present invention.

Referring now to FIG. 1, according to one preferred embodiment of the present invention, the seal or gasket 10 of the present invention comprises a periphery 12 defining a central aperture 14. According to the preferred embodiment depicted in FIG. 1, seal or gasket 10 has at least two opposing elongated sides 16 and 18 and two arcuate opposing ends 20 and 22 joining opposing elongated sides 16 and 18. Each of opposing elongated sides 16 and 18 is serpentine in shape. The term "serpentine" as used herein is meant and intended to define an oscillatory, smoothly varying shape. While according to a preferred embodiment, the waves of the serpentine shape of opposing elongated sides 16 and 18 are of uniform width W and height H as shown in FIG. 1, it will be readily apparent to the skilled artisan that the serpentine curves of opposing elongated sides 16 and 18 may be of differing widths and heights without departing from the spirit of the invention and the scope of the appended claims. Similarly while the serpentine curves are shown in FIG. 1 as in direct opposition, i.e. their respective peaks 13 and valleys 15 facing each other directly, these features, peaks 13 and valleys 15 can be displaced, i.e. lie in other than direct opposition.

Figure 2:
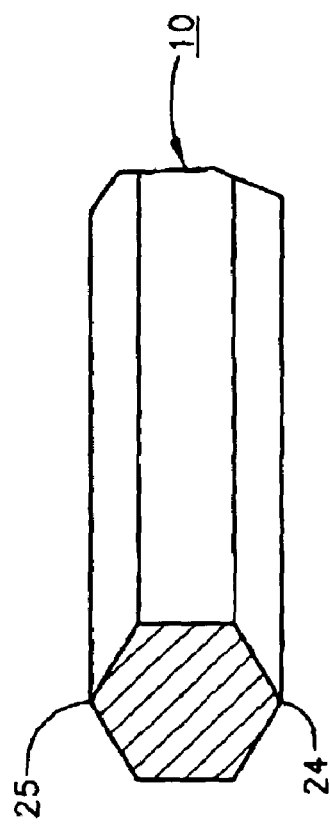
FIG. 2 is a cross-sectional view of the gasket or seal of the present invention along the line 2-2 of FIG. 1.

While seal or gasket 10 is depicted, in FIG. 2 as being hexagonal in cross-section, a preferred profile or cross-section, it will be apparent to the skilled artisan that the profile may be rectangular, round, octagonal or any other suitable shape of the type conventionally utilized in the fabrication of such cryogenic seals and gaskets. In the preferred embodiment depicted in the attached Figures wherein seal or gasket 10 has a hexagonal shape, when positioned between a pair of flanges as described more fully below, seal 10 has a top 25 and a bottom 24 that form the points of contact between seal 10 and the flanges of sections of conduit being joined (see FIGS. 2 and 3 and description of joint below).

Since as described above in connection with the background of the invention, seals or gaskets having a round periphery do not generally tend to exhibit the uneven creep commonly associated with more rectangular or straight-sided such seals, the use of the serpentine periphery is not as important as it is in the case of more generally straight-sided seals, i.e. seals having at least one or perhaps two elongated sides, but round seals having a serpentine periphery and of any suitable cross-section should be considered as within the scope of the present invention. Again, however, the serpentine periphery is best suited and preferred for seals that possess opposing elongated sides or at least one elongated side. In the case of the latter type of seals 10 opposing ends 20 and 22 that connect or join the opposing elongated sides or the ends of a single elongated side, can, but need not be, arcuate and define smooth transition zones 21 and 23 that inhibit the application of expansion and contraction stresses to any localized area of seal 10 as depicted in the accompanying Figures or themselves serpentine so that the application of expansion and contraction stresses to any localized area of seal 10 is inhibited.

Figure 3:
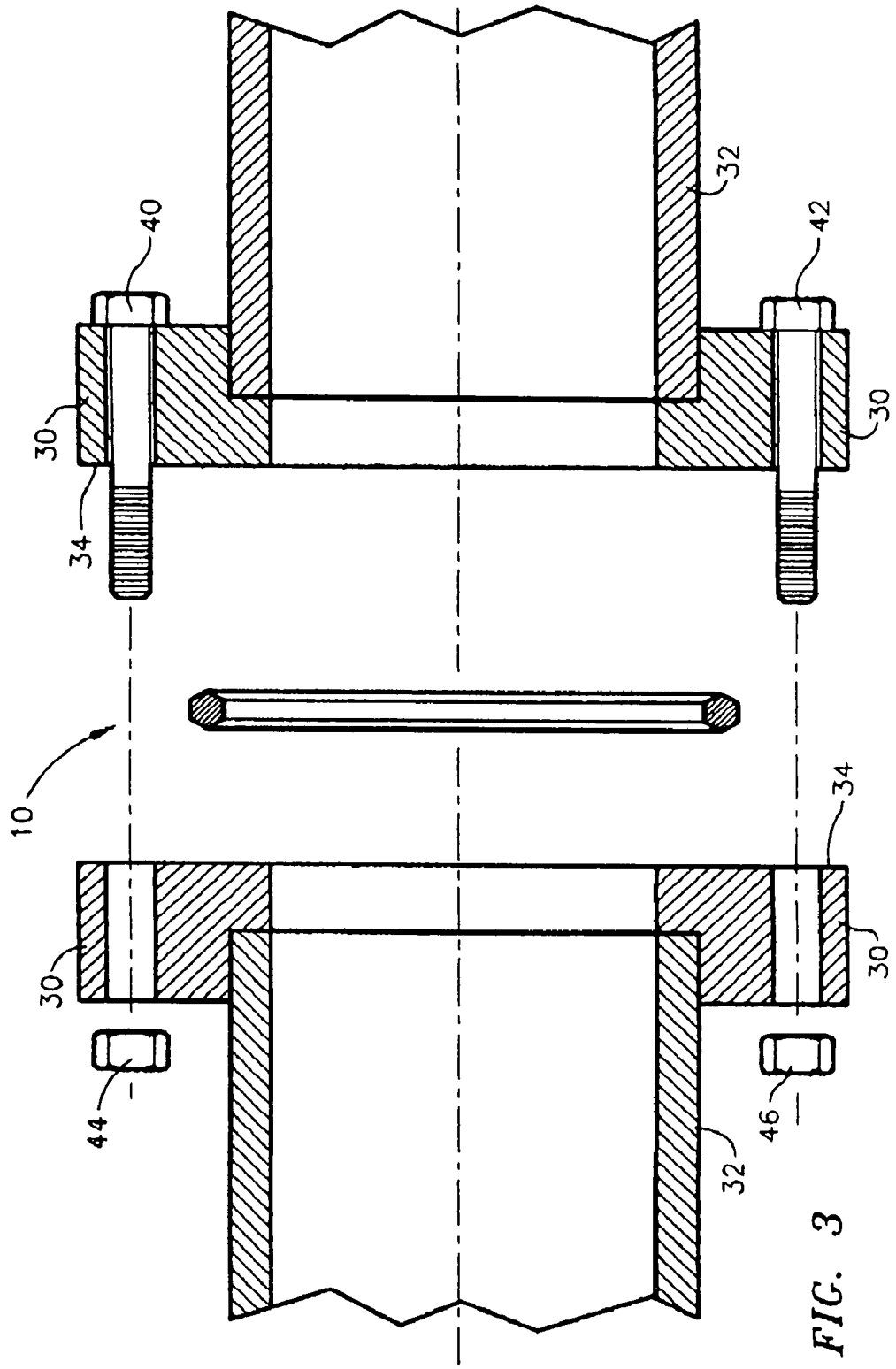
FIG. 3 is an exploded side view of the gasket or seal of the present invention installed between two flanges which are attached to cryogenic fluid conduits and comprise a material dissimilar to that of the seal.

As shown in FIG. 3, in use, seal 10 is inserted between flanges 30 on cryogenic vacuum conduits 32. Flanges 30 can be drawn together and the seal secured, for example, by the tightening of bolts 40 and 42 which can be threaded onto nuts 44 and 46 as shown in FIG. 3 or into threads in one of flanges 30 (not shown). In use, the preferred hexagonally shaped seal 10 depicted in FIG. 2, is oriented such that two of its vertices or top 25 and bottom 24 initially contact opposing flanges 30. Upon tightening of bolts 40 and 42, these vertices are crushed to form the seal. As is conventional practice in the application of seals in cryogenic applications, seal 10 is of a material dissimilar from that of flanges 30 and is simply placed and tightly restrained between the faces 34 of flanges 30 so that it cannot "move", i.e. adapt through expansion and contraction to the severe temperature conditions to which it will be exposed in use under cryogenic conditions while maintaining a tight seal between flanges 30.

In conventional practice, flanges 30 may be of any suitable material that is commonly used in the fabrication of flanges of this type. A conventional such material is NbTi/SS, (Niobium Titanium/Stainless Steel) however other materials of fabrication will be readily known to those skilled in the cryogenic arts.

While a variety of materials dissimilar from those used in flanges 30 can be used in the fabrication of seal 10, specifically preferred for such applications are metals such as aluminum and copper which have demonstrated their utility in cryogenic applications previously.

There has thus been described a metallic seal or gasket for use in the joining of cryogenic vacuum conduits, the seal or gasket comprising a generally planar and serpentine periphery defining a central aperture. According to a preferred embodiment, the periphery has at least two opposing elongated serpentine sides and two opposing rounded ends joining the opposing elongated serpentine sides. While the invention has been described largely in connection with seals useful in sealing joints in cryogenic vacuum conduit, it will be readily apparent to the skilled artisan that such seals are similarly useful in other applications requiring leak resistant sealing in cryogenic applications. These would include, by way of example, seals in conduits for cryogenic fluids and the like.

As the invention has been described, it will be apparent to those skilled in the art that the same may be varied in many ways without departing from the spirit and scope of the invention. Any and all such modifications are intended to be included within the scope of the appended claims.

What is claimed is:

1. A metallic seal comprising:
a generally planar ring having a periphery defining an open center and having a top and a bottom surface and inner and outer sides as referenced against said open center, wherein said inner and outer sides are equidistant from both said top and bottom surfaces, wherein at least a portion of both said inner and outer sides are serpentine with respect to said open center,
wherein the periphery has at least two opposing elongated serpentine sides and two opposing arcuate ends joining the opposing elongated serpentine sides
wherein the arcuate opposing ends define a smooth transition zone between the opposing elongated serpentine sides and the opposing arcuate ends, and
wherein said seal has a hexagonal cross-section, a top and a bottom and the top and the bottom, as oriented in use, are vertices of the hexagonal shape.

2. The metallic seal of claim 1 wherein said seal is fabricated from a metal selected from the group consisting of aluminum and copper.

3. The metallic seal of claim 1 wherein said seal has at least one elongated serpentine side having two opposed ends joined by an arcuate or serpentine portion that inhibits the application of expansion and contraction stresses to any localized area of the metallic seal.

4. A cryogenic conduit joint comprising:
a) a pair of opposing flanges attached to individual cryogenic conduits; and
b) a metallic seal comprising:
a generally planar ring having a periphery defining an open center and having a top and a bottom surface and inner and outer sides as referenced against said open center wherein said inner and outer sides are equidistant from both said top and bottom surfaces, wherein at least a portion of both said inner and outer sides are serpentine with respect to said open center,
wherein the periphery has at least two opposing elongated serpentine sides and two opposing arcuate ends joining the opposing elongated serpentine sides
wherein the arcuate opposing ends define a smooth transition zone between the opposing elongated serpentine sides and the opposing arcuate ends, and
wherein said seal has a hexagonal cross-section, a top and a bottom that contact the opposing flanges and the top and the bottom, as oriented in use, are vertices of the hexagonal shape.

5. The cryogenic conduit joint of claim 4 wherein said seal is fabricated from a metal selected from the group consisting of aluminum and copper.

6. The cryogenic conduit joint of claim 4 wherein said seal has at least one elongated serpentine side having two opposed ends joined by an arcuate or serpentine portion that inhibits the application of expansion and contraction stresses to any localized area of the metallic seal.

* * * * *

UNITED STATES PATENT AND TRADEMARK OFFICE
CERTIFICATE OF CORRECTION

PATENT NO.         : 7,540,502 B1
APPLICATION NO. : 11/366237
DATED              : June 2, 2009
INVENTOR(S)        : Timothy M. Rothgeb et al.

Page 1 of 1

It is certified that error appears in the above-identified patent and that said Letters Patent is hereby corrected as shown below:

Title page

Item (12) should read Rothgeb, et al.

Item (75) Inventors: Should read

Timothy M. Rothgeb, Norfolk, VA and Charles E. Reece, Yorktown, VA

Signed and Sealed this

Seventh Day of July, 2009

JOHN DOLL
*Acting Director of the United States Patent and Trademark Office*